United States Patent Office 2,894,040
Patented July 7, 1959

2,894,040

ISOMERIZATION OF TERPENIC ALCOHOLS

Joseph P. Bain, Albert B. Booth, and Wilbur Y. Gary, Jacksonville, Fla., assignors to The Glidden Company, Cleveland, Ohio, a corporation of Ohio No Drawing. Application September 28, 1953
Serial No. 382,839

15 Claims. (Cl. 260—631.5)

The present invention is concerned with the preparation of certain terpene alcohols which are capable of being hydrogenated to a menthol.

In copending application Serial No. 377,000, filed August 27, 1953, it was shown that by autoxidation of limonene and decomposition of the peroxide so formed by treatment with sodium sulfite under alkaline conditions, there could be obtained a good yield of 2,8-p-menthadiene-1-ol. Similarly, it was shown in said application that 2-p-menthene-1-ol could be produced by the same treatment of carvomenthene.

Since these alcohols can be readily obtained by following the teachings of the above-mentioned copending application and since they are thus made readily available, it would be desirable to be able to convert them into isomeric alcohols having the hydroxyl at the 3-positions, since these could then be hydrogenated to menthols.

Accordingly, it is an object of the present invention to provide a process for converting the above tertiary alcohols into the corresponding allylic isomers oxygenated at the 3-positions.

Another object is to provide a process for converting certain terpene alcohols not capable of being hydrogenated to a menthol, into forms that are capable of being hydrogenated to a menthol.

Additional object is to provide a new process for the production of piperitol.

A further object is to provide a new process for the production of isopiperitenol.

Still another object is to produce compounds of the p-menthane series having an oxygenated substituent in the 3-position from 1-hydroxy-$\Delta^2$ compounds of the p-menthane series.

Other objects will be apparent to those skilled in the art.

Although the above-mentioned tertiary alcohols cannot be hydrogenated to methol, since they have the hydroxyl group in the 1-position, and menthol is a secondary alcohol having its hydroxyl group in the 3-position, we have found that if any of the above tertiary alcohols be contacted with an acid under the proper conditions, there occurs an allylic rearrangement with the production of the isomeric 3-hydroxy compound. The 3-hydroxy compound is suitable for hydrogenation to menthol. The reactions can be illustrated as follows:

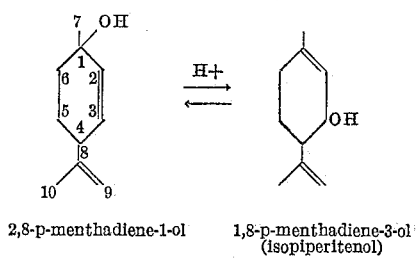

2,8-p-menthadiene-1-ol    1,8-p-menthadiene-3-ol
(isopiperitenol)

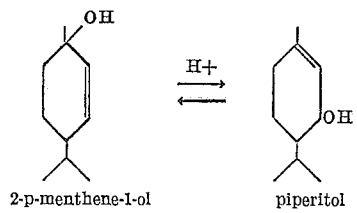

2-p-menthene-1-ol    piperitol

As is indicated above, the reaction is reversible and will come to an equilibrium under suitable conditions. The secondary alcohol can be removed from the mixture as by fractional distillation, and the tertiary alcohol fraction again contacted with the acid to form more secondary alcohol, so that ultimately nearly all of the tertiary alcohols can be converted to the secondary alcohols. Each of the alcohols shown is capable of existence in cis and trans forms, and we have found that all possible forms are present in substantial quantities, though not like quantities, if the system is allowed to approach equilibrium. This is of some importance if it is desired to produce menthol, particularly optically active menthol, from piperitols or isopiperitenols obtained from the allylomerization. Thus, it is known that d-trans-piperitol hydrogenates chiefly to d-isomenthol which can be converted by methods known to the art to 1-menthol, but 1-cis-piperitol, which is the epimer of d-trans-piperitol and is produced along with it by acid allylomerization of 1-2-p-menthene-1-ol, hydrogenates to 1-neo-menthol, which is convertible by known methods to d-menthol but not to 1-menthol.

The isopiperitenols follow the same pattern.

Thus, it is possible to obtain either family of menthols from either family of tertiary alcohols, since starting with d-2-p-menthene-1-ol, d-menthol can be had from 1-trans-piperitol, and 1-menthol from d-cis-piperitol. If a mixture of cis and trans piperitols from the allylomerization of the same tertiary alcohol is hydrogenated, and the resultant isomeric menthols isomerized to menthol without separation of the intermediate iosomeric menthols, racemic menthol will be obtained along with an active menthol corresponding to that piperitol which was in excess. These points will be appreciated by those familiar with the art. Of course, if racemic starting materials are used, all subsequent products will be racemic.

Besides preparing menthol intermediates from 2-p-menthene-1-ol, or 2,8-p-menthadiene-1-ol, the tertiary alcohol as well can be prepared from piperitol or isopiperitenol, respectively, from another source, if it is desired to do so, since the allylomerization is reversible.

All of the unsaturated alcohols here considered are readily dehydrated to hydrocarbons. The propensity of piperitol to dehydrate has been observed in the literature. Consequently, it is preferable to allylomerize these alcohols under very mild conditions. We have found that the allylomerization can be efficiently conducted by treating the alcohols with a dilute mineral acid at around room temperature or with hot distilled water around the boiling point. In general, weaker acids require higher temperatures and/or longer contact times, and stronger acids lower temperatures and/or shorter contact times. Since the alcohols are not generally miscible with water or dilute acids, the effect of agitation is significant, because it determines contact. Also, when hot distilled water is used as acid, considerable difference in contact time may be required depending upon whether the distilled water contains traces of silica or alkali leached from bottles or dissolved gases picked up in the laboratory. This is because the allylomerization is essentially an acid catalyzed reaction and the pH of distilled water is known to be markedly affected by traces of impurities.

It is not necessary to bring the allylomerization to equilibrium if a non-equilibrium mixture contains more of the desired isomer than remains when equilibrium is reached. The reaction can be stopped at any point simply by making it alkaline, and the desired components separated by fractional distillation, crystallization, formation of derivatives or other physical or chemical processes.

Unlike some systems, the acid isomerization of one allylic form into another in the system here considered is accomplished with complete retention of optical activity. By this is meant that although the numerical values and direction of the rotations change in going from one isomer to the other, each has that fraction of optical activity that the original member had, so that if an optically pure 2-p-menthene-1-ol is allylomerized and the mixture separated into pure fractions of each of the components resulting from the allylomerization, each component will be substantially optically pure. It is apparent that the isomerization considered here involves only the 1, 2 and 3 carbon atoms, so that suitably substituted 2-p-menthene-1-ols, whose substituents are of such type and so located in the molecule that they do not interfere with allylomerization, can also be converted to the corresponding substituted piperitols or isopiperitenols by this reaction. Also, it is possible to produce 3-oxygenated analogues in those cases where the reaction involved in producing the analogue is carried out under acidic conditions. Thus, esters, ketones and other analogues can be prepared. Much of the analytical work was carried out using infrared spectrophotometry for identification and quantitative estimation of components. Absorption spectrograms of carefully purified compounds were used as standards. The preparation of the piperitols is known to the art. The preparation and properties of 2-p-menthene-1-ol, 2,8-menthadiene-1-ol and isopiperitenol are given in copending application Serial No. 377,000. Both the 2,8-p-methadiene-1-ol and the 2-p-menthene-1-ol exist in cis and trans modifications. The lower boiling is designated herein as the $\alpha$ form and the higher boiling as the $\beta$ form.

*Example 1*

10 grams of the $\beta$-2,8-p-menthadiene-1-ol, purified by recrystallization, B.P. 92° C. at 10 mm., $d_4^{26}$ 0.9280, $n_D^{25}$ 1.4819, F.P. 19.5° C., was agitated and refluxed with 50 grams of water and samples of the oil were withdrawn at intervals for infrared analysis. It was found that at the end of one hour refluxing, the oil contained 39% isopiperitenol, at the end of three hours' refluxing 44% and at the end of seven hours 34%. The spectra of the samples also showed that both $\alpha$ and $\beta$ forms of the tertiary alcohol were present in these isomerization mixtures, thereby showing the conversion of the $\beta$ to the $\alpha$ form of 2,8-p-menthadiene-1-ol.

*Example 2*

10.0 ml. of a fraction containing 97% isopiperitenol obtained by careful fractional distillation of a product produced by the boiling water isomerization of $\beta$-2,8-p-menthadiene-1-ol was agitated and refluxed with 50 ml. distilled water for 3 hours. At this time 36% isopiperitenol remained. When the starting material was the pure recrystallized tertiary alcohol, there was 44% isopiperitenol at the end of 3 hours' refluxing with water. This difference may be due to a difference in the efficiency of agitation. At the end of 6 hours' refluxing with water in the present case, the isopiperitenol had dropped to 26% and there was also a loss of 33% of the total alcohol, thus showing the inadvisability of a long period of treatment.

*Example 3*

395 grams of a crude mixture obtained by fractionation of the alkaline sodium sulfite treated air oxidation mixture of d-limonene, and containing 43% of $\alpha$-2,8-p-menthadiene-1-ol, the balance being primarily limonene-8,9-monoxide, but also containing a carbonyl compound, was mixed with 2 pints of distilled water, agitated and refluxed for 2 hours. Samples were withdrawn at the end of 30 minutes, one hour and two hours. Infrared analyses of these samples showed that there was only a negligible change after the first hour.

The mixture was allowed to settle and cool to 50°; then the phases were separated. The oil was fractionally distilled through an efficient fractionating column, first at 100 mm. until the water was removed, then at 10 mm. to a head temperature of 98.5° C., and the balance at about 1 mm. Only 43.5% of the charge was distilled due to the high boiling point of the glycol formed by hydration of the oxide. Infrared analyses were made on all the fractions and residue. There was not more than 3% hydrocarbon recovered, and this may have been largely present in the original sample. There was only a slight trace of the monoxide remaining. The next higher boiling compounds, below isopiperitenol, represented 23% of the charge. This was composed of about equal proportions of both the $\alpha$ and the $\beta$ tertiary alcohols and the original carbonyl compound. There was 9.2% isopiperitenols which calculates 16% of the original tertiary alcohol. The last two distilled fractions which totaled 25 grams had the same infrared spectrum as the 210 gram residue, and altogether this compound represented 63% of the recovered material and appeared to be limonene-8,9-glycol.

*Example 4*

840 grams of a mixture containing 78% $\alpha$-2,8-p-menthadiene-1-ol, the balance being mostly limonene-8,9-oxide and a small quantity of a carbonyl compound, was placed in a 3-liter flask with one quart of distilled water, stirred and refluxed for 2 hours at about 100°. At the end of one hour, infrared analysis indicated 24.3% isopiperitenol in the total organic phase and 27.6% at the end of two hours. These are equivalent to 31% and 35%, respectively, on the basis of the original tertiary alcohol. The ratio of the $\beta$-tertiary alcohol to the $\alpha$-tertiary alcohol was greater at the end of 2 hours than it was at the end of one hour. The oil was then separated and fractionated through an efficient fractionating column at 100 mm. until all the dissolved water was distilled, then at 10 mm. to a pot temperature of 175°, and finally at about 1 mm. to a pot temperature of about 190°. Infrared analyses of the fractions showed that there was an isopiperitenol yield of 22% on the gross basis or 28% on the original tertiary alcohol basis. There was no apparent loss of optical activity of either the $\alpha$ or $\beta$ form of the tertiary alcohols, and their material recovery was practically quantitative based on the original alcohol less the isopiperitenol produced. The fraction richest in isopiperitenol was about 92% pure and showed $\alpha_D^{25}$ +36.4° (10 cm. tube). About half of the limonene-8,9-oxide was not changed, probably due to lack of vigor in the agitation, but its glycol was the chief constituent of the fractions boiling above isopiperitenol and the still residue, the later representing only 4.5% of the charge.

Hydrogenation of the isopiperitenol with platinum oxide catalyst under a hydrogen pressure of 60 p.s.i.g. maximum until 86% of the theoretical amount of hydrogen for 2 double bonds was taken up yielded 73% of a mixture of menthols rich in isomenthol and 27% piperitol.

*Example 5*

1620 grams of combined fractions of oxidized limonene derivatives containing about 85% of $\beta$-2,8-p-menthadiene-1-ol, the balance being dihydrocarvone, limonene-8,9-oxide, an unidentified carbonyl compound, and other lesser impurities, was stirred vigorously and refluxed with 2100 ml. of distilled water for 3 hours. The product now contained 32% isopiperitenol on the gross basis or 37% on the basis of the original tertiary alcohol, the analyses being made from infrared spectra of the reaction mixture. The phases were separated and the product fractionated through an efficient fractionating column at 100 mm. until the dissolved water was removed, then at 10 mm. to a still pot temperature of 176°, and finally at about 3 mm. to a still pot temperature of 210°. This left a still pot residue of only 3% of the charge. Infrared analysis of the fractions now indicated a yield of 25% isopiperitenol on the gross basis or 29.5% on the basis of the original tertiary alcohol. The purest fraction of isopiperitenol was calculated to be 99% and had a rotation of $\alpha_D^{26}$ +24.2° (10 cm. tube). The fractions boiling below isopiperitenol contained 8% hydrocarbons and a mixture of the $\alpha$ and $\beta$ forms of the tertiary alcohol. In the higher boiling fractions was found the limonene-8,9-glycol but the residue was mostly other compounds.

*Example 6*

A 420 gram fraction from the fractional distillation of air oxidized and sodium sulfite reduced d-limonene which containing about 65% $\alpha$-2,8-p-menthadiene-1-ol, the balance being mostly limonene-8,9-oxide, was mixed with 840 g. of distilled water and agitated vigorously at 22–25° for 8 hours without appreciable change being detected by infrared analysis. One ml. glacial acetic acid was added and agitated at 25° two hours without significant change, then three hours longer at 25° with 5 more ml. glacial acetic acid but still without significant change. 10 ml. of 25% sulfuric acid in aqueous solution was now added and the mixture agitated 2 hours at 22–33° to produce essentially the same changes as obtained by refluxing either of the tertiary alcohols for 2 hours with water. Agitation was continued 2 hours longer at 30°±1° to produce more hydroxyl groups. The limonene-8,9-oxide was not changed until after the addition of the sulfuric acid, and it was completely changed at the end of the 4 hours' agitation. The solution was now made strongly alkaline by the addition of sodium hydroxide and heated to refluxing for a few minutes. The mixture was allowed to settle and cool and the phases were separated. The oil was now fractionally distilled through an efficient fractionating column at 10 mm. through the isopiperitenol range, then at about 2 mm. until most of the limonene-8,9-glycol was distilled, leaving a still pot residue of only 3%. The usual recovery of $\alpha$ and $\beta$-tertiary alcohols was obtained.

*Example 7*

Fractions containing both the tertiary alcohols, but none of the isopiperitenol, recovered from the boiling water isomerization of the separately isomerized tertiary alcohols were combined. Infrared analysis showed this mixture to contain a total of about 85% tertiary alcohol, the balance being a carbonyl compound with practically no limonene-8,9-oxide. 1120 grams of this mixture was mixed with 1120 grams of distilled water, and refluxed for 3 hours while stirring vigorously. Infrared analysis now showed 31% isopiperitenol on the gross basis or 35.5% on the basis of the original tertiary alcohol.

The oil was now separated and fractionally distilled as before at 10 mm. to a still pot temperature of 210°, thus leaving only 6% undistilled. There was none of the glycol obtained previously when the limonene-8,9-oxide was originally present. The isopiperitenol recovered amounted to 18.7% on the gross basis or 22% on the basis of the original tertiary alcohol. There was about 5% hydrocarbon formed. The carbonyl compound and mixture of tertiary alcohols were again recovered as before.

*Example 8*

1000 grams of 2,8-p-menthadiene-1-ol, either $\alpha$ or $\beta$ or mixture of the two, is mixed with 1000° grams of water, agitated to prevent bumping, and refluxed for two hours. The mixture is cooled and the phases separated. The oil is fractionated by distilling through efficient fractionating columns at 100 mm. until all the water has distilled over, then the pressure is reduced to 10 mm. and the fractionation continued to a still pot temperature of 210°. 50 cc. cuts are taken throughout the fractionation of the alcohols. 40% of the products is a mixture of cis and trans isopiperitenol, in approximately equal proportions. About 50% of the material is a nearly equal mixture of the alpha and beta forms of the tertiary alcohols.

*Example 9*

A mixture, 840 grams, consisting of about 80% $\alpha$-2,8-p-menthadiene-1-ol, about 15% limonene-8,9-oxide and a small quantity of carbonyl compounds was treated with about 980 cc. distilled water and this mixture was heated with stirring at about 95–100° C. for two hours. The oil was then separated and fractionated at 10 mm. to recover fractions rich in unreacted $\alpha$-2,8-p-menthadiene-1-ol and limonene-8,9-oxide, $\beta$-2,8-p-menthadiene-1-ol, isopiperitenol and limonene-8,9-glycol. The isopiperitenol was recovered in 41% yield based on the alcohol content of the starting material. There was no apparent loss of optical activity of the 2,8-p-menthadiene-1-ols resulting from this treatment. The fraction richest in isopiperitenol was about 92% purity and showed $\alpha_D^{25}$+36.4° (10 cm. tube). Limonene-8,9-glycol was the chief constituent of the residue.

*Example 10*

A mixture of $\alpha$-2,8-p-menthadiene-1-ol and limonene-8,9-oxide was partially hydrogenated so as to saturate only the 8,9-double bond of the alcohol and this material fractionally distilled. Fractions containing only $\alpha$-2-menthene-1-ol and limonene-8,9-oxide were combined. Infrared spectroanalysis of this mixture showed that it contained approximately 55% of the alcohol and 45% of the oxide.

To 311 grams of this mixture was added an equal weight of distilled water, agitated, and refluxed 5.5 hours. Samples were withdrawn at the end of one hour, 2⅓ hours, 3⅔ hours and 5½ hours. The $\alpha$-tertiary alcohol was partially converted to the $\beta$ form and these two were at an equilibrium in the 3⅔ hour sample. There was an increase in total hydroxyl due to the formation of glycol from the oxide, but not all of the latter was converted.

The mixture was allowed to settle and cool to room temperature and the phases were separated. The oil was now fractionally distilled, first at 100 mm. until the dissolved water was removed, then at 10 mm. until 63% was distilled, and finally at about 1.5 mm. Only 1.85% of the charge remained as residue in the still pot. The lower boiling fractions contained a mixture of $\alpha$-2-p-menthene-1-ol with the unreacted limonene-8,9-oxide. Boiling next above these was a small amount of an unidentified carbonyl compound. Next higher boiling was the $\beta$-2-p-menthene-1-ol formed from the $\alpha$-form. One fraction of the $\beta$-tertiary alcohol representing 4% of the charge had a melting point of 17° and two others of like size 13°. Boiling between the $\beta$-tertiary alcohol and limonene-8,9-glycol was trans-piperitol and this represented about 15% of the charge. The best fraction of the trans-piperitol had the following physical properties: M.P. −4°, $\alpha_D^{25}$ −33.6 (10 cm. tube), $N_D^{25}$ 1.4789, and $d_4^{24}$ 0.922. The highest boiling material was limonene-8,9-glycol.

The lower boiling fractions from the hot water isomerization of the mixture of $\alpha$-2-menthene-1-ol and limonene-8,9-oxide up to a boiling point of about 90°/10 mm. which contained the unreacted limonene-8,9-oxide with most of the unreacted $\alpha$-tertiary alcohol and some of the $\beta$-tertiary alcohol were combined.

155 g. of this material was vigorously agitated with 160 g. of 1% sulfuric acid in aqueous solution at 24–31° for 5 hours and 30 minutes. Comparison of the infrared spectra made at the end of 3 hours and 5.5 hours showed that equilibrium had been reached in the first three hours. The limonene-8,9-oxide was also completely converted to the glycol in the first three hours. This equilibrium was observed to contain α- and β-2-menthene-1-ols and cis- and trans-piperitol.

*Example 11*

375 grams of β-2,8-menthadiene-1-ol of about 82% purity was treated with 367 grams of sodium dichromate in 1468 grams water. To this mixture was added 1015 grams of 50% sulfuric acid with agitation and dropwise over a period of 2 hours. Cooling was employed to maintain the temperature below 36° C. 500 ml. of heptane was added, and the phases separated. After washing the oil phase twice with 100 cc. portions of water, once with 100 ml. saturated sodium carbonate and twice more with water, the oil was dried with anhydrous sodium sulfate. From a small sample the heptane was removed under vacuo and the heptane-free residue was analyzed by infrared methods to show it consisted of 30% alcohols, remainder largely isopiperitenone. No piperitenone was present in this sample. The bulk of the heptane solution was stripped of solvent at atmospheric pressure and the residue was fractionated at 10 mm. Initial fractions consisted of the alcohol and intermediate fractions were almost pure isopiperitenone, B.P. 109–110° C., $\alpha_D^{25}$ +68.3° (10 cm. tube). Higher boiling fractions became progressively richer in the optically inactive piperitenone, B.P. about 114° C., for the fraction richest in this compound, thus demonstrating the easy conversion of isopiperitenone to piperitenone by heat.

*Example 12*

α-2-p-menthene-1-ol, B.P. 85° C. (at 10 mm.), $n_D^{25}$ 1.4698, $d_4^{25}$ 0.915, F.P. 6–8° C., $[\alpha]_D^{25}$ −17.2°, was oxidized according to the method of Organic Synthesis, Collective vol. I, 2nd Ed., p. 340, for the oxidation of menthol to menthone. The oxidation mixture contained over 60% piperitone as shown by infrared absorption analysis, and on fractionation the best fraction consisted of approximately 85% piperitone and had an optical rotation of approximately +42° (10 cm. tube). A similar oxidation of β-2-p-menthene-1-ol, B.P. 91° C., $n_D^{25}$ 1.4729, $d_4^{25}$ 0.915, $[\alpha]_D^{25}$ +69.2°, also gave dextro rotatory piperitone.

*Example 13*

An air oxidation mixture of α-terpineol having a peroxide number of 1405 was heated with an aqueous alkaline sodium sulfite solution in one hour from 25 to 80° C. and the reaction continued at 80°–85° C. for 3 hours. The oil layer was recovered and fractionated. Fractions boiling at about 98° C. at 1 mm. were composed mostly of trans-2-menthene-1,8-diol; the purest fraction showed $n_D^{25}$ 1.4970. Beckman oxidation of such a material yielded a ketol which infrared analysis revealed was 8-hydroxy-piperitone. Fractions recovered from the reduced α-terpineol oxidation mixture boiling at about 113–122° C. at 2.5 mm. contained the cis-form of 2-menthene-1,8-diol, and Beckman oxidation thereof yielded the same 8-hydroxy-piperitone as obtained on oxidation of the trans-form.

*Example 14*

In order to show the equilibrium character of the allylomerization reaction, 11.6 grams of pure trans-piperitol was agitated with 50 cc. of distilled water at reflux for one hour. A sample of the oil recovered from this reaction, when analyzed by infrared methods, consisted of about equal proportions of the α- and β-forms of 2-menthene-1-ol and about 10% piperitol, which was predominately of the trans-form with a smaller amount of the cis-form.

It is thus seen that in general these Δ²-1-hydroxy-p-menthenes are allylomerized to the Δ¹ form upon being exposed to the influence of hydrogen ions. This is so, even though other reactions may also take place during the treatment and even though there are other substituents on the molecule.

In the foregoing description, all temperatures are in degrees centigrade.

It will be appreciated that many variations are possible in the described procedures. For example, if undesirable dehydration occurs in the fractionation of the allylomerized material, this can be substantially reduced by first heating the allylomerizate with alcoholic alkali to remove all traces of acidic material which is known to catalyze dehydration reactions of terpenes.

The preparation of the piperitols, isopiperitenols, and of the 2-menthene-1,8-diols by the method herein described is claimed in the copending application of Bain, Klein and Gary, Serial No. 377,000 filed August 27, 1953, which application also claims the 2,8-p-menthadiene-1-ols, the 2-p-menthene-1,8-diols and the 8,9-limonene-oxide. Isopiperitenol, its preparation by another method and its conversion to menthol is claimed in the Bain et al. application Serial No. 348,825, filed April 14, 1953.

Having described the invention, what is claimed is:

1. The process of preparing a Δ¹-3-hydroxy secondary alcohol of the p-menthane series which consists essentially in subjecting a compound of the p-menthane series having a hydroxyl group at the 1-position and a single, non-conjugated ring double bond in the 2–3 position to the influence of water at a hydrogen ion concentration at least as great as that formed on boiling distilled water at a temperature of about 22° C. to 100° C. and under conditions conducive to allylic rearrangement for a time sufficient to bring about a substantial conversion of the Δ²-1-hydroxy compound to its Δ¹-3-hydroxy isomer and recovering the thus formed Δ¹-3-hydroxy compound.

2. The process of claim 1 in which the hydrogen ions are provided by distilled water and the temperature of the treatment is the atmospheric boiling point of the reaction mixture.

3. The process of claim 1 in which the hydrogen ions are provided by an acid.

4. The process of claim 3 in which the acid comprises sulfuric acid.

5. The process of preparing a Δ¹-3-hydroxy secondary alcohol of the p-menthane series which consists essentially in subjecting a compound selected from the class consisting of 2,8-p-menthadiene-1-ol, 2-p-menthene-1-ol and 2-p-menthene-1,8-diol to the influence of water at a hydrogen ion concentration at least as great as that formed on boiling distilled water at at temperature of about 22° C. to 100° C. and under conditions conducive to allylic rearrangement for a time sufficient to bring about a substantial conversion of the starting Δ²-1-hydroxy compound to its Δ¹-3-hydroxy isomer and recovering the thus formed Δ¹-3-hydroxy compound.

6. The process of claim 5 in which the starting material is 2,8-p-menthadiene-1-ol.

7. The process of claim 6 in which the hydrogen ions are provided by distilled water and the reaction is carried out at the boiling point of the mixture.

8. The process of claim 6 in which the hydrogen ions are provided by an acid.

9. The process of claim 5 in which the starting material is 2-p-menthene-1-ol.

10. The process of claim 9 in which the hydrogen ions are provided by distilled water and the reaction is carried out at the atmospheric reflux temperature of the reaction mixture.

11. The process of claim 9 in which the hydrogen ions are provided by an acid.

12. The process of claim 5 in which the starting material is 2-p-menthene-1,8-diol.

13. The process of claim 12 in which the hydrogen ions are provided by an acid.

14. The process which comprises heating at a temperature of about 22° C. to 100° C. one member of the group consisting of cis-2,8-p-menthadiene-1-ol, trans-2,8-p-menthadiene-1-ol, cis-isopiperitenol and trans-isopiperitenol with water in the presence of an acid under conditions conducive to allylic rearrangement to convert the starting material into a mixture of the compounds of said group, and recovering any other member of the group from the reaction mixture.

15. The process which comprises heating at a temperature of about 22° C. to 100° C. one member of the group consisting of cis-2-p-menthene-1-ol, trans-2-p-menthene-1-ol, cis-piperitol and trans-piperitol with water in the presence of an acid under conditions conducive to allylic rearrangement to convert the starting material into a mixture of the compounds of said group, and recovering any other member of the group from the reaction mixture.

References Cited in the file of this patent

UNITED STATES PATENTS

| | | |
|---|---|---|
| 1,876,454 | Humphrey | Sept. 6, 1932 |
| 1,960,134 | Blagden et al. | May 22, 1934 |
| 2,264,928 | Blagden et al. | Dec. 2, 1941 |
| 2,373,956 | Hearne et al. | Apr. 17, 1945 |
| 2,435,078 | Hearne et al. | Jan. 27, 1948 |
| 2,467,451 | Young | Apr. 19, 1949 |
| 2,565,087 | Porter et al. | Aug. 21, 1951 |

FOREIGN PATENTS

| | | |
|---|---|---|
| 127,575 | Great Britain | May 21, 1919 |

OTHER REFERENCES

Galloway et al.: Chem. Soc. J. (London), pp. 1595–7 (1936).

Galloway et al.: Chemical Abstracts, vol. 31, col. 672 (1937).

Farmer et al.: Chem. Soc. J. (London), pp. 10–13 (1946).

Simonsen: "The Terpenes," vol. 1, p. 351; Cambridge, at the University Press, 1953.

Simonsen: The Terpenes, vol III, 2nd ed. pp. 521 and 522.